Oct. 9, 1962 H. A. MICHLIN 3,058,003
FLEXIBLY CONTROLLED RESULTANT COLOR DISPLAY SIGN
Filed April 8, 1957 2 Sheets-Sheet 1
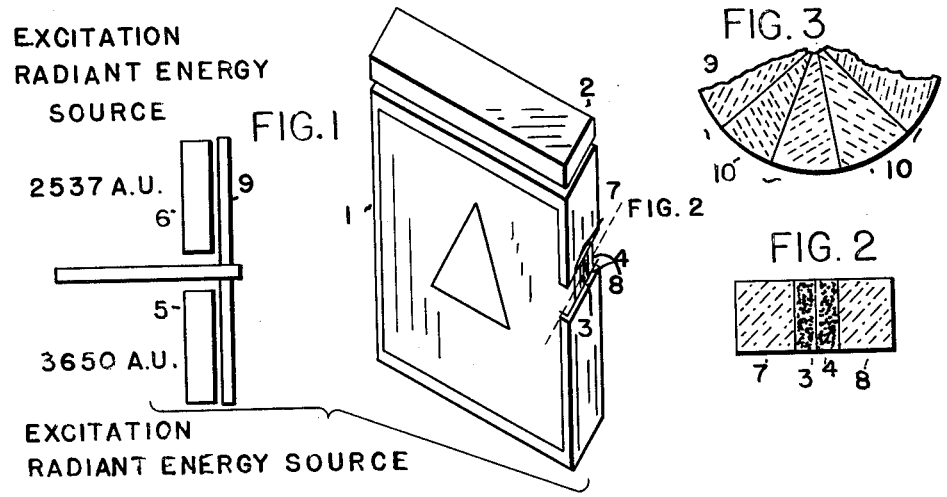
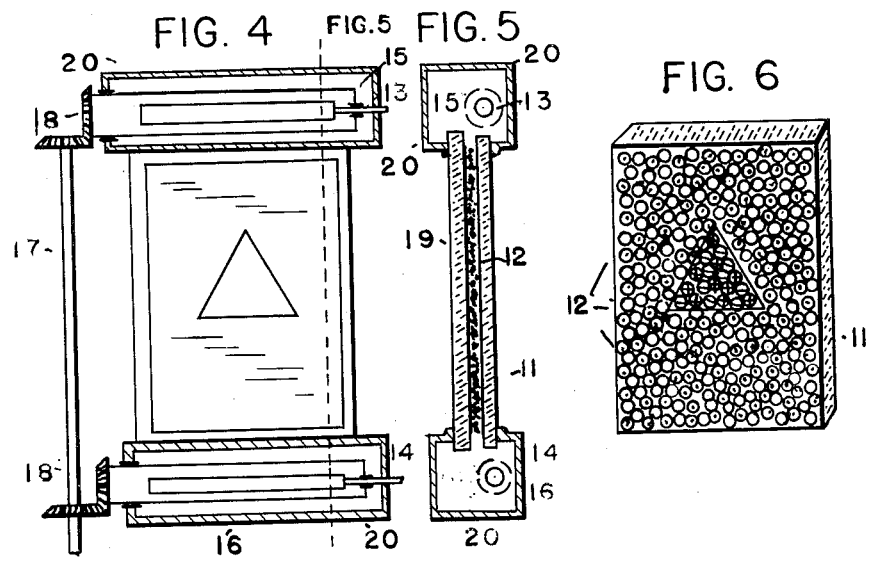
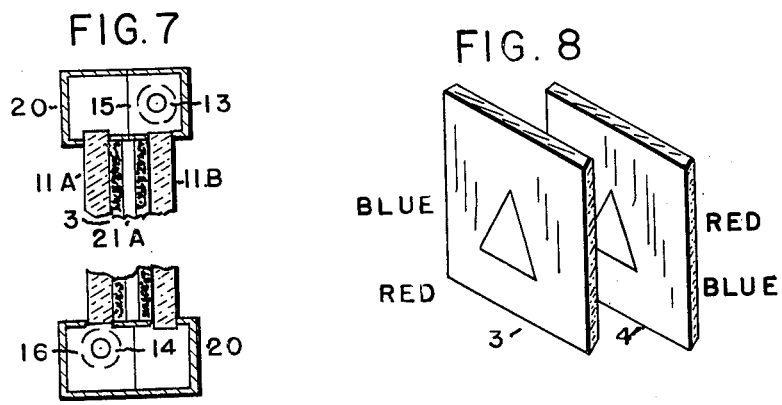

Oct. 9, 1962　　　H. A. MICHLIN　　　3,058,003
FLEXIBLY CONTROLLED RESULTANT COLOR DISPLAY SIGN
Filed April 8, 1957　　　2 Sheets-Sheet 2

United States Patent Office 3,058,003
Patented Oct. 9, 1962

3,058,003
FLEXIBLY CONTROLLED RESULTANT COLOR
DISPLAY SIGN
Hyman A. Michlin, 1575 Odell St., New York 62, N.Y.
Filed Apr. 8, 1957, Ser. No. 651,336
26 Claims. (Cl. 250—213)

This invention relates to methods and means for selectively and controllably exciting a plurality of color patterns to produce resultant color patterns.

One object of this invention is to provide methods and means for producing luminescent color patterns in controlled resultant colors from a plurality of luminescent color patterns under selective control of a plurality of distinguishable excitation energy controls, at least one of which is of radiant energy.

Another object of this invention is to provide methods and means for producing luminescent resultant color patterns from luminescent color patterns under control of excitation radiant and conductive energies.

Another object of this invention is to provide methods and means for achieving luminescent resultant color patterns in the mental combining of sequential and/or half-tone color stimuli.

Another object is to provide a luminescent color display sign having a plurality of selectively and controllably excitable luminescent color patterns arranged in relation to each other so as to produce, on suitable and selective excitation, resultant color patterns.

Another object is to provide a luminescent sign having in intermixture in at least one layer at least two kinds of luminescent substances, each kind sensitive to peak excitation by a different distinguishable radiant energy to emit in the visible spectrum, at least one of said kinds of luminescent substances having at least two different types of luminescent substances with each said type peak emitting in a different part of the visible spectrum, each said kind of luminescent substances forming a luminescent color pattern, and said luminescent color patterns arranged in relation to each other so as to form, on suitable selective and controlled excitation, resultant color patterns.

Another object is to provide methods and means for controllably exciting and varying color emission in luminescent color patterns to produce resultant color patterns.

Another object is to provide methods and means for selectively and controllably varying the intensities of luminescent excitation energies to produce changing resultant color patterns.

Figure 9:
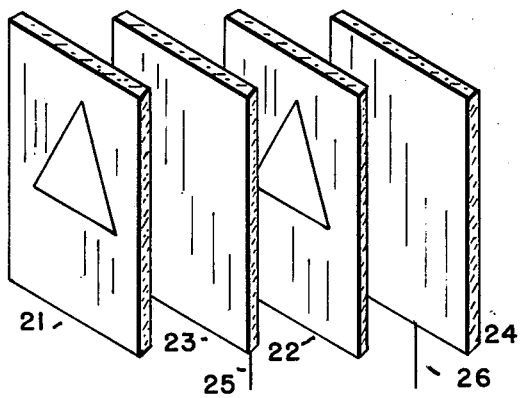
Figure 10:
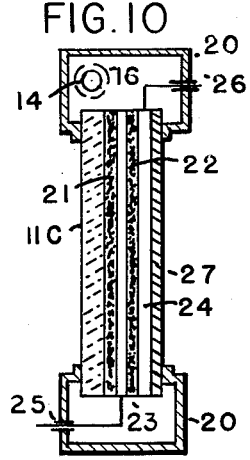
Figure 11:
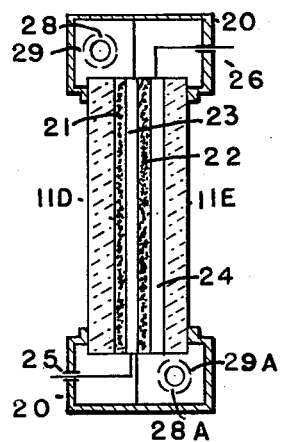
Figure 12:
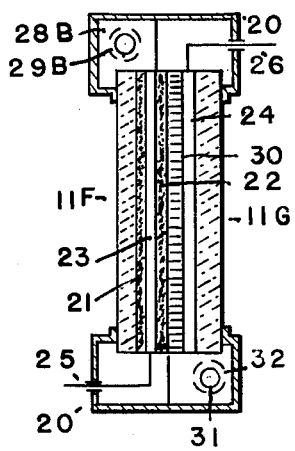
Figure 13:
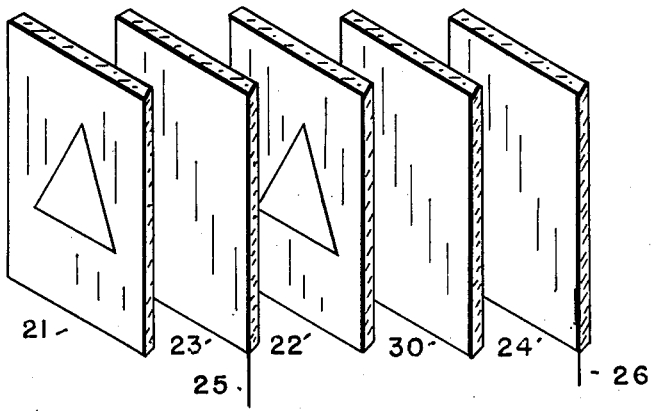

Many objects, features and advantages of this invention will be evident to those skilled in the art by referring to the above-said objects taken separately or in connection with each other, and, the following description, claims and drawings wherein the schematical illustrations in FIGURE 1 is a representative display sign and apparatus of the invention; in FIGURE 2 is a cross-section of part of FIGURE 1; in FIGURE 3 is an example of rotatable segmented varied transparency screen; in FIGURE 4 is a radiant energy control embodiment of the invention; in FIGURE 5 is a side view of FIGURE 4; in FIGURE 6 is a half-tone luminescent sign of the invention; in FIGURE 7 is another form of radiant energy control embodiment of the invention; in FIGURE 8 is a luminescent sign capable of being controlled by radiant energy; in FIGURE 9 is a luminescent sign capable of being controlled by radiant and conductive energies; in FIGURE 10 is a radiant and conductive energy control embodiment of the invention; in FIGURE 11 is another radiant energy and radiant-conducting energy control embodiment of the invention; in FIGURE 12 is a radiant energy control and radiant-energy-electric application control embodiment of the invention; and in FIGURE 13 is a luminescent sign capable of being radiant energy controlled and radiant-energy-electric application controlled.

Basic to the invention is the underlying principle of using plural excitation energy controls, at least one of which is radiant energy, for forming luminescing resultant color patterns.

To illustrate the above-said basic principle reference is made to FIGURES 1, 2, 3 and 8. Frame 1 has removable cover 2 so as to enable one to change or remove one or more elements therein so as to change or vary the resultant color patterns, which can be in the form of letters, images and etc. for advertising, display and etc., purposes. It is obvious that, for example, both layers 3 and 4 emitting luminescent color patterns may be encased in glass, plastic and other suitable transparent material 7 and 8 so that the resultant color patterns can be viewed from both sides.

The luminescent layer 3 comprises photoluminescent substances peak sensitive to excitation control by peak excitation radiant energy in the 3650 A.U. range from source 5; and the luminescent layer 4 comprises photoluminescent substances peak sensitive to excitation control by peak excitation radiant energy in the 2537 A.U. range from source 6. Each said luminescent layer 3 and 4 having different color photoluminescing substances, which may be organic and/or inorganic, arranged so as to emit in a multicolor pattern, as illustrated in FIGURE 8 and described below, on their selective and controlled excitation. Each said luminescent layer, preferably, in direct optical contact with each other; although it is obvious that resultant color effects may be produced with said layers in close proximity to each other without optical contact. The luminescent color patterns of said layers 3 and 4 are superposed with the image and background in register so as to form a resultant color pattern. The said layers 3 and 4 are sandwiched between the transparent layers 7 and 8 with the said layer 7, which can be quartz for example, capable of transmitting excitation radiant energy of from 2537 A.U. to 3650 A.U. therethrough so as to controllably and selectively excite each luminescent layer 3 and 4; and the transparent layer 8 of such materials, as is known to the art, as to transmit visible light rays and to filter out the harmful light rays in the ultra-violet range so as to minimize the harmful effects therefrom to a viewer.

The excitation radiant energy source 6 peak emitting in the 2537 A.U. range, may be a low pressure mercury type lamp; and the excitation radiant energy source 5 peak emitting in the 3650 A.U. range, may be a high pressure mercury type lamp. These sources are merely by way of example as fluorescent lamps can be made readily available by the skill of the art which peak emit in said ranges.

The rotatable segmented varied transparency screen 9 is schematically illustrated in FIGURE 3 where the segments 10 are each in varied degrees of transparency, and, so arranged with respect to each other that when a segment of poor transparency to the transmission of radiant energy is between the excitation radiant energy source 5 and the display sign, there is a segment of high transparency to the transmission of radiant energy between the said source 6 and the display sign; so that when the said screen 9 is rotated there is effected a change in transparency to the transmission in inverse order of intensity of transmission of the excitation radiant energies from each of said sources 5 and 6 so that when there is a succession of increases in transparency to radiant energy transmission from source 5 there is a succession of decreases in transparency to radiant energy transmission from source 6 and vice-versa to, thereby, inversely vary the intensity of each of the excitation radiant energy controls exciting each luminescent layer 3 and 4 so as to selectively vary the intensity of luminescent emission from each said layer 3 and 4 to, thereby varying the resultant color emission. Transparent non-scattering layers of phosphors are preferred in all the luminescent layers described herein.

To describe an example of operation, the varying transparency screen 9 is rotated so as to vary inversely the relative transmission of the different distiguishable radiant excitation energies from sources 5 and 6, so as to vary the intensities of the luminescent multicolor pattern emitting from each photoluminescent layer 3 and 4, respectively, thereby varying the relative color intensity forming the resultant color patterns of the varying resultant color patterns.

(1) *Radiant Energy Control For Forming Half-Tone Photoluminescing Resultant Color Patterns*

Reference is made to FIGURES 4, 5 and 6 to illustrate an example of a photoluminescing half-tone embodiment.

Referring to FIGURE 6, transparent panel 11, for transmitting the excitation radiant energies therethrough by reflections between continuous opposite surfaces, has thereon two luminescent half-tone color patterns of photoluminescent substances, for example photoluminescent silicate phosphors, peak sensitive to excitation control by peak excitation radiant energy in the 2537 A.U. range, as are schematically illustrated as circles with vertical line for red emitting phosphors to form the triangle, and circles with dots therein for blue emitting phosphors to form the background, thereby forming one half-tone resultant color pattern. Another luminescent half-tone color pattern of photoluminescent substances, for example photoluminescent zinc sulphide phosphors, peak sensitive to excitation control by peak excitation radiant energy in the 3650 A.U. range, as are schematically illustrated as circles with crossed lines for blue emitting phosphors to form the triangle, and, circles for the red emitting phosphors to form the background, thereby forming the other half-tone resultant color pattern. The both luminescent half-tone color patterns are the same in this illustration, differing only in color, and, are placed in register and in intermixture on and in optical contact with panel 11 so as to form a luminescent resultant color pattern 12, on suitable and controlled excitation, and which can be varied in resultant color emission as the intensities of emission of each half-tone color pattern is varied relative to each other. This is only by way of example as the skill of the art may vary the resultant color pattern by varying the patterns of the color half-tones in accordance with preference.

FIGURES 4 and 5 schematically illustrates a front and side view, respectively, of a display sign with the luminescent resultant color pattern 12, and transparent panel 11 for transmission of the excitation radiant energies and elongated excitation radiant energy sources 13 and 14 of peak 2537 A.U. and peak 3650 A.U., respectively. Here the circular rotatable transparency segment screen 9, schematically illustrated in FIGURE 3, is in the form of tubes 15 and 16 of elongated segments in varied degrees of transparency, with each transparency segment of such dimension as to be disposed along the length of said radiant energy sources 13 and 14; and in such order of transparencies that the said tube 16 is disposed to vary the intensity of the excitation radiant energy of 3650 A.U. transmitted to panel 11 from high to low while the tube 15 is disposed to vary the intensity of the excitation radiant energy of 2537 A.U. transmitted to panel 11 from low to high on rotation of shaft 17 and gears 18 so as to rotate the tubes 15 and 16. A filter layer 19, of material as known to the art, filters out the harmful rays below 3500 A.U. The housing 20 for the excitation radiant energy sources 13 and 14 and the segmented varied transparency tubes 15 and 16 can be made of light transmitting materials.

To describe a mode of operation of the display sign, each rotating varied segmented transparency tube 15 and 16 is rotated by mechanical means 17 and 18 so as to effect a transmission of excitation radiant energies in varying intensity from each source 13 and 14, respectively, in inverse order of intensity to and through panel 11, so as to excite each half-tone color pattern sensitive thereto to emit luminescence in inverse intensities so as to vary the resultant color patterns in accordance with the relative intensities of the color pattern emissions.

(2) *Radiant Energy Controls for Forming Photoluminescing Resultant Color Patterns*

Reference is made to FIGURES 7 and 8 to illustrate an example of a photoluminescent resultant color pattern embodiment.

Luminescent layer 3 is made up of photoluminescent phosphors, for example photoluminescent silicate phosphors, peak sensitive to excitation control by peak excitation radiant energy in the 2537 A.U. range from source 13, with blue emitting phosphors for the triangle and red emitting phosphors for the background. The luminescent layer 4 is made up of photoluminescent phosphors, for example photoluminescent zinc sulphide phosphors, peak sensitive to excitation control by peak excitation radiant energy in the 3650 A.U. range from source 14, with red emitting phosphors for the triangle and blue emitting phosphors for the background on photoluminescence. A very thin filter layer 21A of plastic, glass and etc, to limit the transmission of harmful ultra-violet rays is interposed between and in optical contact with the triangles and backgrounds of both luminescent layers in register; and the whole thereof is interposed between and in optical contact with panels 11A and 11B, which panels transmits the excitation radiant energies therethrough as is described above with reference to panel 11. The rotatable segmented varied transparency tube 16, on rotation, controls the intensity of transmission of excitation radiant energy from source 14, as described above, so as to vary the intensity of emission from the luminescent layer 3; and, the rotatable segmented varied transparency tube 15, on rotation, controls the intensity of transmission of excitation radiant energy from source 13, as is described above, so as to vary the intensity of emission from luminescent layer 4; with the timing of rotation of said tubes 15 and 16 effected by known means, for example the mechanical means 17 and 18 schematically illustrated in FIGURE 4, so as to systematically and selectively vary the excitation control of luminescence of each photoluminescent layer 3 and 4 so as to vary the luminescent resultant color pattern. Housing 20 for excitation radiant energy sources 13 and 14 and the segmented varied transparency tubes 15 and 16 can be made of light reflecting material.

To describe a mode of operation of the display sign, each rotating segmented varied transparency tube 15 and 16 are rotated, as described above, so as to effect a transmission of excitation radiant energy in varying intensity from each source 13 and 14, respectively, in inverse order of intensity through the panels 11A and 11B, respectively, so as to controllably excite each luminescent layer 3 and 4, respectively, to emit luminescent color patterns in inverse intensity levels, respectively, so as to vary the formation of resultant color patterns in accordance with the relative intensities of the color pattern emissions.

(3) *Radiant and Conductive Energy Controls for Forming Photoluminescing and Electroluminescing Resultant Color Patterns*

Reference is made to FIGURES 9 and 10 to illustrate an example of a photoluminescing and intrinsic or carrier-injection electroluminescing resultant color pattern embodiment.

Luminescent layer 21 is made up of photoluminescent phosphors, for example photoluminescing zinc sulphide phosphors, peak sensitive to excitation control by peak excitation radiant energy in the 3650 A.U. range from source 14, with red emitting phosphors forming the triangle and blue emitting phosphors forming the background. The luminescent layer 22 is made of electroluminescent phosphors, for example electroluminescent zinc sulphide phosphors, examples are disclosed in Patent No. 2,774,902 and other patents and literature of the prior art, with blue emitting phosphors forming the triangle and red emitting phosphors forming the background. Obviously, the electroluminescent phosphors can be the type, which are well known to the art, for example those disclosed in Patent No. 2,773,216, capable of varying its color emission in accordance with the frequency of electric application so that in combination with variations of intensity of the photoluminescent emission from layer 21 there is effected changes or variations in resultant color patterns. The said electroluminescent layer 22 is, preferably, sandwiched between thin light transmitting conductive layers 23 and 24, for example metal, such as antimony, tin and etc., vaporized on glass as is well known to the skill of the art, with conductors 25 and 26 representative of sources of direct, varying or alternating current of sufficient potential difference for producing different intensities of luminescent emission or varying color emission by electroluminescence.

Each of the said layers, schematically illustrated in FIGURE 10, are placed in superposed compact relation and, preferably, in optical contact with each other, and, with the triangles and the backgrounds of the luminescent layers 21 and 22 in register; and the compacted layers sandwiched between panel 11C for transmission of excitation radiant energy in peak 3650 A.U. range from source 14, and transparent insulation layer 27, with the free side of the photoluminescent layer 21 in optical contact with the panel 11C, and, the free side of the transparent conductive layer 24 in optical contact with the transparent insulation layer 27.

To describe a mode of operation, the rotatable segmented varied transparency tube 16, on rotation, controls the intensity of the excitation radiant energy transmitted therethrough from source 14 through panel 11C, as described above, so as to vary the intensity of emission from the luminescent layer 21; and the electric current is transmitted to the conductive layers 23 and 24 to be applied to the luminescent layer 22 to effect luminescent emission; and is varied in a synchronous and systematic manner by known means, such as a mechanical connection between an electric current control means and the rotation of the segmented varied transparency tube 16, to effect controlled intensity of emission of the photoluminescent layer 21 and electroluminescent layer 22, to effect varying or changing resultant color emission patterns in accordance with the relative intensities of the color emission patterns. Such mechanical connection can be elements 17 and 18 schematically illustrated in FIG. 4 to rotate, for example only, a rheostat control synchronously with the rotation of rotatable segments varied transparent tube 16.

(4) *Radiant Energy Controls for Forming Photoluminescing and Electrophotoluminescing Resultant Color Patterns*

Reference is made to FIGURES 9 and 11 to illustrate an example of a photoluminescing and electrophotoluminescing resultant color embodiment.

Luminescent layer 21 is composed of photoluminescent phosphors, for example photoluminescent zinc sulphide phophors, sensitive to excitation control by excitation radiant energy preferably in the ultra-violet range from source 28, with red emitting phosphors forming the triangle and blue emitting phosphors forming the background. The luminescent layer 22 is composed of electrophotoluminescent phosphors, that is phosphors sensitive to luminescence on application of electric current and to more intense luminescence on irradiation of the luminescing substances with excitation radiant energy, preferably in the ultra-violet region, so as to effect, thereby, electrophotoluminescence in accordance with the intensity of said excitation radiant energy, said intensities of excitation conductive energy and excitation radiant energy sufficient to effect the degree of intensity of electrophotoluminescence desired is known to the skill of the art. This is by way of example as electrophotoluminescent phosphors can be used which, after conductive energy excitation of the electrophotoluminescent layer to luminescing, the irradiation of excitation radiant energy effects quenching of the luminescent emission. It is obvious to the skill of the art that other methods of application of excitation radiant and conductive energies can be used for the purpose of varying the intensity of luminescent emission so as to produce varying resultant color emission. For example, variations of color emission, as disclosed in Patent No. 2,780,731 can be used.

The said electrophotoluminescent layer 22 is, preferably, sandwiched between and in optical contact with thin light transmitting conductive layers 23 and 24, for example metal such as tin, antimony and etc., vaporized on glass in a manner known to the skill of the art, with the conductors 25 and 26 to represent sources of electric current of such potential difference, as is known to the skill of the art, for producing a low intensity of luminescent emission. Each of said layers, schematically illustrated in FIGURE 11, are placed in superposed compact relation and, preferably, in optical contact with each other, and, with the triangles and backgrounds of the said luminescent layers 21 and 22 in register; and the compacted layers sandwiched between panel 11D for transmission of excitation radiant energy in the ultra-violet range from source 28, and, panel 11E for transmission of excitation energy in the ultra-violet range from source 28A; with the photoluminescent layer 21 in optical contact with panel 11D, and, the transparent conductive layer 24 in optical contact with panel 11E. It is preferred that the transparent conductive metal film be vaporized on the panel 11E, which can be of glass, for more efficient transmission of excitation radiant energy therethrough to the electrophotoluminescent layer 22 to effect better excitation control.

The rotatable segments varying transparency tube 29, on rotation, controls the intensity of transmission of the excitation radiant energy transmitted therethrough through panel 11D from source 28, in a manner described above, so as to control the intensity of emission from the photoluminescent layer 21; and electric current is applied to the electrophotoluminescent layer 22 to conductively excite said layer 22 to low constant luminescent emission, with the rotatable segmented varied transparency tube 29A, on rotation, controlling the intensity of transmission of the excitation radiant energy therethrough from source 28A through panel 11E, in a manner described above, so as to control the intensity of emission from the electrophotoluminescent layer 22; with the timing of rotation of said tubes 28 and 28A effected by known means, for example the mechanical means 17 and 18 schematically illustrated in FIGURE 4, so as to systematically and selectively vary the excitation control of the intensity of luminescence of the photoluminescent layer 21 and the electrophotoluminescent layer 22 so as to vary the resultant color pattern. The housing 20 for the excitation radiant energy sources 28 and 28A, and the segmented varied transparency tubes 29 and 29A, can be made of light reflecting material.

To describe a mode of operation of the display sign, electric current of sufficient potential difference from sources 25 and 26 is applied to conductive layers 23 and 24 to effect a low luminescent emission; each rotatable segmented varying transparency tube 28 and 28A are rotated, as described above, so as to effect a transmission of inverse intensities of excitation radiant energy from each source 28 and 28A, respectively, in inverse changing intensities through the panels 11D and 11E, respectively, so as to controllably excite each luminescent layer 21 and 22, respectively, to emit color patterns in inverse intensity levels, respectively, so as to vary the formations of resultant color patterns in accordance with the relative intensities of the color pattern emissions.

*(5) Radiant Energy Controls for Forming Photoluminescing and Electroluminescing Resultant Color Patterns*

Reference is made to FIGURES 12 and 13 to illustrate an example of photoluminescing and electroluminescing resultant color embodiment.

Luminescent layer 21 is composed of photoluminescent phosphors, for example photoluminescent zinc sulphide phosphors, sensitive to excitation control by excitation radiant energy preferably in the ultra-violet range from source 28B, with red emitting phosphors forming the triangle and blue emitting phosphors forming the background. The luminescent layer 22 is composed of electroluminescent phosphors, for example electroluminescent zinc sulphide phosphors, with blue emitting phosphors forming the triangle and red emitting phosphors forming the background. The said electroluminescent layer 22 has thereon a thin light transmitting photoconductive layer 30, for example cadmium sulphide peak sensitive to photoconductive excitation to peak 5200 A.U.: and the said layers are, preferably, sandwiched between thin light transmitting conductive layers 23 and 24, examples of which are described above, with conductors 25 and 26 representative of sources of direct, varying or alternating current sufficient in potential difference, as is known to the skill of the art, for producing different intensities of luminescent emission on transmission through photoconductive layer 30.

Each of the said layers, schematically illustrated in FIGURE 13, are placed in superposed compact relation and, preferably, in optical contact with each other, and, with the triangles and the backgrounds of the lumnescent layers 21 and 22 in register; and the compacted layers sandwiched between panel 11F for transmission of excitation radiant energy in the preferably, ultra-violet range from source 28B; and, panel 11G for transmission of excitation radiant energy in peak 5200 A.U. range from source 31; and with the free side of the photoluminescent layer 21 in optical contact with panel 11F, and, the free side of the transparent conductive layer 24 in optical contact with glass panel 11G of, preferable, insulating property. It is obvious that the vaporized light transmitting layer of metal can be vaporized directly on panel 11G to form the transparent conductive layer 24.

The rotatable segmented varied transparency tube 29B, on rotation, controls the intensity of transmission of the excitation radiant energy transmitted therethrough from source 28B through panel 11F, as described above, so as to vary the intensity of emission from the luminescent layer 21; and the rotatable segmented varied transparency tube 32, on rotation, controls the intensity of the transmission of the excitation radiant energy transmitted therethrough from source 31 through panel 11G, as described above, so as to vary the degree or frequency of photoconductivity of the photoconductive layer 30 so as to effect an application of a different intensity in electric current or change in frequency of electric current to the electroluminescent layer 22 so as to vary the intensity of emission of the electroluminescent layer 22. Under ideal conditions of substances having electroluminescence effect under low current application, a thin layer of photoemissive substances can be used instead of a photoconductive layer. Where the thin photoconductive layer has a thin layer of photoemissive substances thereon, there is effected a combined control of electric supply and a formation therefrom of electric frequencies in higher frequencies than can be obtainable in photoconductive effect alone, due to the faster response to excitation of a photoemissive layer to radiant energy than a photoconductive layer; to thereby, by such methods and means, as a further improvement, impress a higher frequency of electric energy application to the electroluminescent layer 22 so as to vary the intensity and color emission of the electroluminescent layer 22. It is obvious that where an image in controlled varying electric frequencies and intensities is produced by two images in radiant energy, each in controlled different frequencies and intensities, are produced on and emitted from the photoemissive layer; then by applying this image in different electric frequencies and intensities on a phosphor layer, there will result a changing color image in accordance with the different frequencies applied thereto. Each of the two said radiant energy images can be formed on a separate radiant energy image source and projected in overlapped relation on the photoelectric layer combination of photoconductive and photoemissive substances; and the image can be varied in intensity or in off and on transmission in the frequencies desired; for example, in the latter instance, a mechanical shutter.

It is obvious that by synchronous and selected rotations of the tubes 29B and 32 effected by known means, for example the mechanical means 17 and 18 schematically illustrated in FIGURE 4, there is effected a systematic and selective excitation control of the intensity of luminescence of the photoluminescent layer 21 and the electroluminescent layer 22 so as to vary the resultant color pattern. The housing 20 for the excitation radiant energy sources 28B and 31, and the segmented varied transparency tubes 29B and 32 can be of light reflecting material.

To describe a mode of operation of the display sign, electric current of sufficient potential difference from sources 25 and 26 is applied to conductive layers 23 and 24 so that when the photoconductive layer 30 is under low to high excitation control from low to high intensities of excitation radiant energies, respectively, there is effected a transmission of electric energy therethrough so as to produce a low to high intensity of luminescent emission, respectively, from the electroluminescent layer 22. Each rotatable segmented varied transparency tube 28B and 30 are rotated, as described above, so as to effect a transmission of inverse intensities of excitation radiant energy from each source 28B and 31, respectively, through panels 11F and 11G, respectively, so as to controllably excite the luminescent layer 21, and, also, the photoconductive layer 30, to thereby control electric applications indirectly and controllably to excite the electroluminesment layer 22 so that each luminescent layer 21 and 22 emits color patterns in inverse intensity levels so as to vary the formations of resultant color patterns in accordance with the relative intensities of the color pattern emissions.

While particular examples have been illustrated and described, many modifications may be made without departing from the scope and spirit of the invention.

I claim:

1. A photoluminescent display screen emitting in half-tone resultant color pattern comprising at least one photoluminescent layer having arranged therein at least two kinds of photoluminescent substances, each said kind sensitive to peak excitation by a different peak excitation radiant energy, each said kind having at least two types each type emitting in a different peak visible color, each said kind arranged to emit in a half-tone color pattern on excitation thereon, each said half-tone color emitting pattern arranged with respect to each other so as to form a half-tone resultant color pattern on selective and controlled excitation thereof.

2. A photoluminescent display device emitting in half-tone resultant color pattern comprising the photoluminescent display screen of claim 1 and means to selectively and controllably excite each said kind of photoluminescent substances with a peak radiant excitation energy to form the half-tone resultant color pattern.

3. A photoluminescent display screen comprising a plurality of photoluminescent layers, said layers selectively sensitive to excitation by a different excitation radiant energy, the luminescing substances arranged in each said layer so as to form a color pattern on being uniformly excited by a different excitation radiant energy, each said layer arranged with respect to each other as to form a resultant color pattern on excitation of same.

4. A photoluminescent display device comprising the photoluminescent display screen of claim 3 and a plurality of sources of different excitation radiant energy, each to selectively excite each said layer to emit in a different intensity so as to form a resultant color pattern.

5. A luminescent display screen comprising a plurality of luminescent layers in superposed relation to each other, at least one of said layers having photoluminescent substances arranged to emit in a color pattern on being excited by a excitation radiant energy, at least one of said layers having electrophotoluminescent substances arranged to emit in a color pattern on being excited by excitation electric and radiant energy, each said electrophotoluminescent layer sandwiched between conductance layers having light transmitting properties so as to transmit light in at least in one direction from said luminescent layers, each said luminescent layer arranged with respect to each other so as to form a resultant color pattern on selective and controlled excitation thereof.

6. The luminescent display device comprising the luminescent display screen of claim 5 and means of at least one source of excitation radiant energy and at least one source of excitation conductive energy to selectively and controllably excite each of the photoluminescent and electrophotoluminescent layers whereby visible radiations representative of the resultant color patterns are emitted.

7. The system for forming an image in electric frequencies in controlled electric energy intensity and frequency for application to a phosphor layer to form color images and other purposes comprising a layer of photoconductive substances and of photoemissive substances in electric contact, means for irradiating the photoelectric layer with an image in radiant energies in controlled intensities and frequencies whereby forming electric frequencies in accordance with the frequency of photoemission, and, intensity in accordance with the degree of intensity of radiant energy exciting photoconductivity.

8. A luminescent display sign comprising a plurality of luminescent layers in superposed relation to each other, at least one of said layers having photoluminescent substances arranged to emit in a color pattern on being excited by an excitation radiant energy, at least one of said layers having electroluminescent substances arranged to emit in a color pattern on being excited by an excitation conductive energy, said electroluminescent layer sandwiched between conductance layers having light transmitting properties so as to transmit light in at least one direction from said luminescent layers, each said luminescent layer arranged with respect to each other as to form a resultant color pattern on selected and controlled excitation thereof.

9. A luminescent display device comprising the luminescent display sign of claim 8 and means of at least one source of excitation radiant energy and at least one source of excitation conductive energy to selectively and controllably excite each of the photoluminescent and electroluminescent layers whereby visible radiatons representative of the resultant color pattern are emitted.

10. A luminescent display screen comprising a plurality of luminescent layers, at least one of said layers having photoluminescent substances arranged to emit in a color pattern on being excited by an excitation radiant energy, at least one of said layers having electroluminescent substances arranged to emit in a color pattern on being excited by an excitation electric energy, each said electroluminescent layer having thereon a photoelectric layer sensitive to an excitation radiant energy, each said electroluminescent and photoelectric layer being sandwiched between conductance layers having light transmitting properties so as to transmit in at least one direction from said luminescent layers, each said luminescent layer arranged with respect to each other so as to form a resultant color pattern on excitation thereof.

11. The method for producing resultant color patterns with a plurality of separate excitation energy controls at least one of which is of radiant excitation energy comprising the steps of arranging a plurality of different kinds of luminescent substances, each kind selectively sensitive to a separate excitation energy control, each kind arranged to emit in a different luminescent multi-color pattern on uniform excitation thereof; arranging the said different kinds of luminescent substances emitting in each of the color luminescent emission pattens in relation to each other so as to form a resultant color pattern to a viewer on selected and controlled excitation thereof; and selectively and controllably subjecting each said kind of the luminescent substances to their respective separate excitation energy controls whereby effecting a resultant color pattern; and selectively varying each of the excitation energy controls with respect to each other so as to cause the resultant colors in the resultant color pattern to vary.

12. The method for selectively and controllably exciting luminescent substances to produce resultant color patterns comprising the steps of arranging a plurality of different kinds of luminescent substances to emit in patterns of different colors on luminescence thereof, each kind selectively sensitive to a different distinguishable excitation energy control at least one of which is of radiant excitation energy, each kind arranged to emit in a different luminescent multi-color pattern on uniform excitation thereof; arranging each of the color luminescent emission pattern in relation to each other so as to form a resultant color pattern to a viewer on selected and controlled excitation thereof; and selectively and controllably subjecting each said kind of luminescent substances to their respective excitation energy controls whereby forming a resultant color pattern; and selectively varying each of the excitation energy controls so as to vary the resultant color pattern.

13. The method of claim 11 in which at least one of the excitation energy controls varies in time whereby selectively varying and controlling the multi-color emission pattern of at least one luminescent layer.

14. The method of claim 11 in which at least one of the excitation energy controls is in electric frequencies whereby selectively controlling the color emission of at least one luminescent layer; and the step of applying radiant energies in frequency variations to photoconductive and photoemissive substances of a photoelectric layer to produce the electric frequencies in said frequency variations.

15. A luminescent screen having characteristics of at least one layer of luminescent substances having arranged therein at least a first and second luminescent multi-color patterns, said multi-color patterns arranged in relation to each other as to form a resultant color pattern, said luminescent substances comprising at least three kinds of luminescent substances each said three kinds having different combinations of excitation and emission characteristics; at least one of said three kinds sensitive to excitation radiant energy; each of at least two of said three kinds emitting in such color and arranged in such relation to each other as to form a first luminescent multi-color pattern and sensitive to a first excitation energy; at least one of the other of said kinds emitting in a second luminescent color pattern and sensitive to an excitation energy distinguishable from said first excitation energy; and said color patterns of luminescent substances arranged in relation to each other as to form a luminescent resultant color pattern.

16. A photoluminescent display device comprising a plurality of photoluminescent phosphor excitation controls, each said control emitting a different peak wave excitation radiant energy; at least one panel for transmitting the excitation radiant energies therethrough by internal reflections; a plurality of different photoluminescent phosphors in optical contact with said at least one panel; said different phosphors comprising dfferent kinds of phosphors, each said kind sensitive to activation by a different peak wave excitation radiant energy, each said kind comprising a plurality of different phosphors each emitting in a different color, said different color emitting phosphors of each kind arranged to emit in a color pattern; each said color pattern arranged with respect to each other so as to form a final color pattern from such combination of color patterns on luminescence thereof.

17. A photoluminescent display device comprising a plurality of photoluminescent phosphor excitation controls, each said control emitting different peak wave excitation radiant energy; at least one panel for transmitting the excitation radiant energies therethrough by internal reflections; a plurality of layers of different photoluminescent phosphors, each layer in optical contact with a surface of the at least one panel; said different photoluminescent phosphors in each layer is a different kind of phosphors, each said kind sensitive to activation by a different peak wave excitation radiant energy; each said kind comprising a plurality of different phosphors each emitting in a different color, said different color emitting phosphors of each kind arranged to emit in a color pattern; each color patterin in each layer arranged with respect to each color pattern in each different layer so as to form a final color pattern from the combined color patterns on luminescence thereof.

18. A luminescent display device comprising at least one photoluminescence excitation control, each said control emitting an excitation radiant energy; at least one panel for transmitting the excitation radiant energies therethrough by internal reflections; a light transmitting conductance layer in optical contact with a first surface of each said at least one panel; a layer of electrophotoluminescent substances in optical contact with the free side of said light transmitting conductance layer, a conductance layer on the free side of the electrophotoluminescent layer; a layer of different photoluminescent phosphors in optical contact with a second surface opposite said first surface of each of said at least one panel; each said layer of photoluminescent and electrophotoluminescent having different phosphors, each different phosphor in each layer emitting in a different color, said different color emitting phosphors of each kind arranged to emit in a color pattern; and each color pattern in each layer arranged with respect to each other color pattern of each different layer so as to form a final color pattern from the combined color patterns on luminescence thereof.

19. A luminescent display device comprising at least one photoluminescent excitation control, each said control emitting an excitation radiant energy; at least one panel for transmitting the excitation radiant energies therethrough by internal reflections; conductance layers with an electroluminescent layer therebetween on a first surface of each said at least one panel; a layer of different photoluminescent phosphors in optical contact with a second surface opposite said first surface of each of said at least one panel; each said photoluminescent and electrophotoluminescent layers having different phosphors, each of the different phosphors in each layer emitting in a different color, said different color emitting phosphors of each kind arranged to emit in a color pattern; each color pattern in each layer arranged with respect to each other color pattern of each different layer so as to form a final color pattern from the combined color patterns on luminescence thereof.

20. The display device of claim 19 and a photoelectric layer between the electroluminescent layer and a conductive layer and in which the photoelectric layer comprises a photoconductive layer with a photoemissive layer on a surface thereof, the free surface of said photoemissive layer in contact with a surface of the electroluminescent layer in which the photoelectric layer comprises a photoconductive layer with a photoemissive layer on a surface thereof, the free surface of said photoemissive layer in contact with a surface of the electroluminescence layer.

21. The luminescent display device comprising the luminescence display screen of claim 10 and means of at least one source of excitation radiant energy and one source of excitation electric energy, the source of excitation electric energy for transmitting electric energy to the conductance layers and photoelectric layer, and the excitation radiant energy for selectively and controllably exciting each photoluminescent layer and for electrically and controllably exciting the photoelectric layer to selectively and controllably effect transmission of excitation electric energy to each of the electroluminescent layers so as to form resultant color patterns.

22. A luminescent display device comprising a plurality of different distinguishable excitation controls at least one of which is an excitation radiant energy control; a plurality of different kinds of phosphors, each different kind of phosphor sensitive to selective excitation by a different distinguishable excitation control; the different kinds of phosphors arranged in at least one layer; each different kind of phosphors emitting in a different color light ray and arranged with respect to each other as to emit in a plurality of multi-color patterns on excitation thereof by their respective distinguishable excitation controls, each said multi-color pattern arranged with respect to each other so as to form a resultant color pattern.

23. The means for producing a color image comprising sandwiching a layer of phosphor between a conductive layer and a photoemissive layer, applying a photoconductive layer on the free side of said photoemissive layer, a conductive layer on the free side of said photoconductive layer, said phosphor layer sensitive to color change in accordance with the electric frequencies impressed thereon; means for applying potential difference to said conductive layers; and means for impressing an image in light rays in different frequencies and intensities on the photoconductive and photoemissive layers whereby applying an image in electric frequencies to the phosphor layer to produce a color image in colors and intensities representative of the image in electric frequencies and intensities.

24. A photoelectric and electroluminescent assembly comprising in sequence and in superimposed relation to each other a photoconductive layer, a layer of photoemissive substances, a phosphor layer, and a conductive layer.

25. The method for producing a multi-color image comprising the step of forming an image in different electric frequencies; and the step of applying the said image to an electroluminescent phosphor layer having phosphors therein capable of changing the color of emission in accordance with the image of different electric frequencies impressed thereon thereby producing the multi-color image representative of the image in different electric frequencies.

26. The method for producing a multi-color image comprising the step of forming an image in different electric frequencies and intensities; and the step of applying the said image to an electroluminescent phosphor layer having phosphors therein capable of changing the color of emission in accordance with the image of different frequencies and intensities of emission in accordance with the intensities impressed thereon thereby producing the multi-color image representative of the image in different electric frequencies and different intensities.

References Cited in the file of this patent

UNITED STATES PATENTS

| | | |
|---|---|---|
| 2,603,757 | Sheldon | July 15, 1952 |
| 2,605,335 | Greenwood et al. | July 29, 1952 |
| 2,730,644 | Michlin | Jan. 10, 1956 |
| 2,757,103 | Briggs et al. | July 31, 1956 |
| 2,765,419 | Roberts | Oct. 2, 1956 |
| 2,785,220 | Reed | Mar. 12, 1957 |
| 2,792,447 | Kazan | May 14, 1957 |
| 2,796,532 | Teague et al. | June 18, 1957 |
| 2,802,753 | Crosby et al. | Aug. 13, 1957 |